United States Patent [19]

Hutchin

[11] Patent Number: 4,725,146
[45] Date of Patent: Feb. 16, 1988

[54] METHOD AND APPARATUS FOR SENSING POSITION

[75] Inventor: Richard A. Hutchin, Marlboro, Mass.

[73] Assignee: Novon, Inc., Swampscott, Mass.

[21] Appl. No.: 814,086

[22] Filed: Dec. 24, 1985

Related U.S. Application Data

[63] Continuation of Ser. No. 537,716, Sep. 30, 1983, abandoned.

[51] Int. Cl.$^4$ ............................................. G01B 11/14
[52] U.S. Cl. .................................................... 356/375
[58] Field of Search ................................. 356/375, 376

[56] References Cited

U.S. PATENT DOCUMENTS

| | | |
|---|---|---|
| 3,586,665 | 6/1971 | Weyrauch. |
| 3,662,180 | 5/1972 | Jorgensen et al. |
| 3,704,070 | 9/1972 | Johnson et al. |
| 3,799,675 | 9/1974 | Johnson et al. |
| 3,867,036 | 2/1975 | Detwiler et al. ............ 250/237 G |
| 4,176,276 | 9/1979 | Kaul et al. |
| 4,231,662 | 9/1980 | Feinland et al. |
| 4,272,196 | 6/1981 | Indebetouw ...................... 356/376 |
| 4,373,816 | 2/1983 | Laib ................................. 250/237 G |

Primary Examiner—R. A. Rosenberger
Attorney, Agent, or Firm—Cushman, Darby & Cushman

[57] ABSTRACT

A system for determining the position of an object in which a moving periodic pattern is projected onto the object. A sensor on the object generates a sensor signal related to the periodic pattern. A reference signal is generated relating to the position of the moving periodic pattern. The sensor signal and the reference signal are compared to determine the position of the object. The pattern may be generated by projecting light through two gratings which are separated and have the same pattern. Errors created by instability or nonisotropy can be corrected employing a third grating having a different pattern and generating a correction value related to the difference between the position of the object determined employing the pattern generated by the two gratings and the pattern generated by the third grating. The moving nature of the pattern may be created by employing a fixed projector and a moving mirror. The reference signal may be generated by a sensor in the field of the moving periodic pattern fixed with respect to the coordinate system in which the position of the object is determined or by monitoring the position of the rotating mirror.

22 Claims, 7 Drawing Figures

METHOD AND APPARATUS FOR SENSING POSITION

This is a continuation of application Ser. No. 537,716, filed Sept. 30, 1983, now abandoned.

BACKGROUND OF THE INVENTION

1. Field of the Invention

This invention relates to the measurement of position and orientation of an object using one or more photometric sensors attached to the object and a special illuminator.

2. Description of the Prior Art

For various applications such as inspection of machined parts or control of a robot manipulator, it is desired to know the position and orientation of an object as it is moved through space. Whether the object is a contact probe for automatic inspection, a robot assembly gripper or the like, the data requirements are similar. In current technology, the object coordinates are found using encoders built into precision hardware such as granite blocks on air bearings or arm extenders which connect the object to a reference base. In order to achieve an accurate measurement of the object coordinates, the connecting hardware must be stiff and heavy, which results in slow and expensive apparatus.

To overcome these problems optical systems have been developed, as described in U.S. Pat. Nos. 3,662,180, 704,070 and 3,799,675. The first two of these patents teach direction determining systems in which a simple cylindrical grating or one cylindrical grating which moves with respect to a second cylindrical grating surrounds a light source. This leads to inaccuracies. The above-cited patents relate to angular position determining systems. U.S. Pat. Nos. 4,231,662, 4,176,276 and 3,586,665 relate to linear position determining systems.

SUMMARY OF THE INVENTION

The present invention replaces the mechanical connecting hardware of the prior art with an optical system of high accuracy. In the present invention, a projector transmits a precise, time repetitive pattern of light to one or more sensors on the object whose position is to be determined. The time varying intensity patterns received by those sensors are processed electronically to measure their time delays and thereby deduce the accurate position and/or orientation of the object at rates up to 1000 measurements per second and faster while freeing the object from the constraints of mechanical measurement hardware. The result is a lighter weight, less expensive and higher bandwidth system which retains precise measurement and control.

The time repetitive pattern of light may be created by a projector which creates a fixed pattern and a rotating mirror for causing the pattern reflected in the mirror to move across the sensor. The projector may include two grids for creating the pattern. A third grid having a different special frequency may be included to enable the elimination of source instability and nonisotropy.

While each projector can give information about only one coordinate to each sensor, several illuminators can illuminate the same volume from different directions, using different temporal frequencies or timing so that one sensor can receive light from multiple illuminators and sort out which signal comes from which illuminator. In this manner, multiple coordinate measurements can be made with a single sensor sufficient to completely determine its position. Logically, this concept can be extended to include multiple sensors on a single rigid object.

By determining the position of each sensor in space, both the position and orientation of the rigid object can be determined. It is also possible to determine complete position and orientation of a rigid object by obtaining at least six coordinate measurements from sensors attached to the rigid object even though the measurements from any one sensor do not completely determine its position. At least six coordinate measurements are required since a rigid object has six degrees of freedom to determine its position and orientation.

BRIEF DESCRIPTION OF THE DRAWINGS

These and other objects and advantages of this invention will become more apparent and more readily appreciated from the following detailed description of the presently preferred exemplary embodiments of this invention taken in conjunction with the accompanying drawings, of which.

DETAILED DESCRIPTION OF THE PRESENTLY PREFERRED EXEMPLARY EMBODIMENTS

Figure 1:
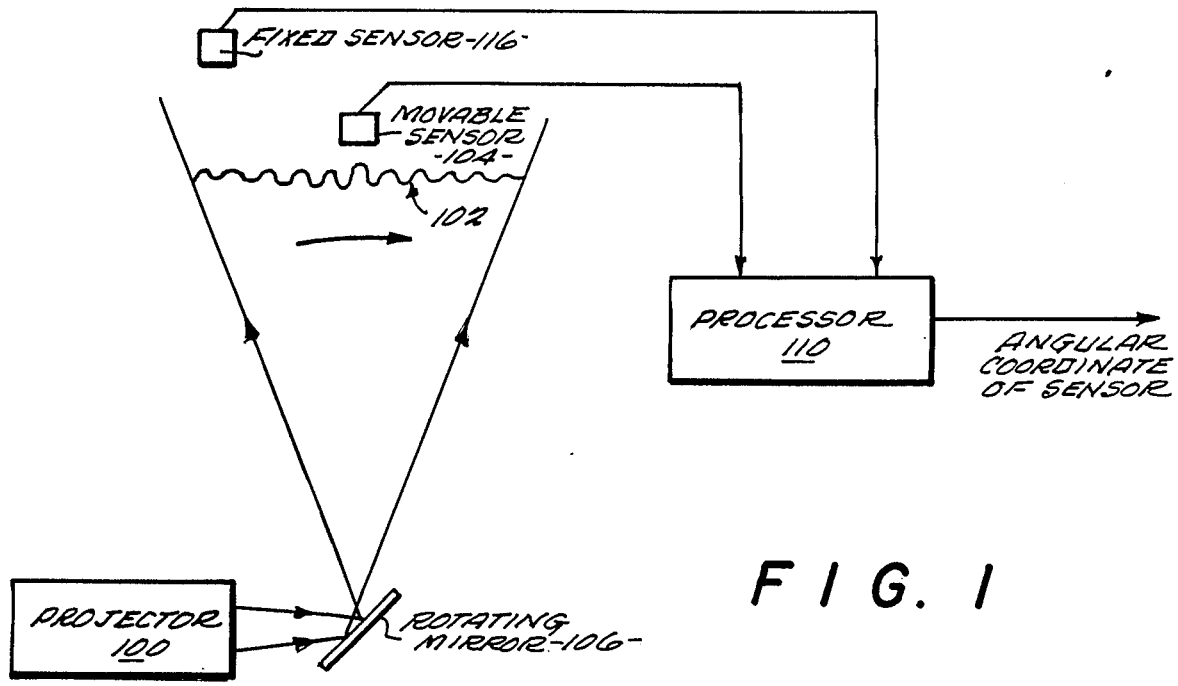
FIG. 1 is a schematic diagram of one embodiment of the present invention.

FIG. 1 illustrates the general form of this invention. Projector 100 projects a periodic light pattern 102 such as a grating pattern which is swept across sensor 104 attached to the object, using rotating mirror 106. The signal from sensor 104 is sent to a processor 110. Sensor 116, fixed with respect to the coordinate system in which the object is being measured, is also within the field which receives a pattern reflected from mirror 106. Although sensors 104 and 116, in this preferred embodiment, are photosensors, many optical sensors are reported in the literature which may be employed. Of course, more than one reference sensor may be utilized to detect precisely when a mirror face moves by.

The signal from sensor 116 is also applied to processor 110. Processor 110 estimates the time delay between the signal from sensor 104 and the signal from sensor 116 by correlating the measured signals with each other or a common reference. If sensor 104 moves to the right in FIG. 1, then the signal from sensor 104 will be delayed slightly in angle and in time since the mirror must rotate further to illuminate the sensor. This angle delay is measured by processor 110 using, for instance, a pattern matching scheme such as correlation where the signal from sensor 104 is compared to an ideal signal $I(\theta + D\theta)$ shifted by different rotational angles $D\theta$ until a best match is found. Many different schemes are presented in the literature to determine the shift of the signal from sensor 104, and the invention concept does not depend on which scheme is used. Examples of both the mathematical theory and hardware can be found in Anthony D. Whalen, *Detection of Signals in Noise* (1971, Academic Press, New York & London), p. 336; L. R. Rokner and C. M. Rader *Digital Signal Processing* (1972, IEEE Press); and R. W. Hamming, *Digital Filters* (Prentice Hall, 1977).

In one of the preferred embodiments illustrated in FIG. 1, a fixed photosensor 116 is placed in or near the working volume so that the fixed sensor sees the same illumination pattern as movable sensor 104, except with a different angular delay. By using fixed sensor 116 to measure the timing of each facet and by designing the rotating mirror to have a very uniform rotation rate, time can be used by inference to calculate the mirror position.

With this configuration, processor 110 measures the time delay of signals from sensors 104 and 116 and takes the difference between the two delays multiplied by twice the angular velocity of the rotating mirror 106 to get the angular separation between sensors 104 and 116. The angular velocity can be found by using fixed sensor 116 to measure the signal timing for consecutive facets and dividing by the known angle between facets.

An important feature of this invention is that light pattern 102 is not a simple beam but has considerable modulation within it. In the preferred embodiment, that modulation has a strong component at one spatial frequency since such a modulation is especially easy to process using Fourier transforms or a variety of other phase estimation techniques reported in the literature for periodic signals. See Whalen, supra. By using a periodic modulation of at least five cycles across the beam and preferably about 50 cycles, neither the exact amount of modulation nor the intensity envelope of the beam are critical to the measurement. Also ambient light which is not nearly the temporal frequency of moving patterns 102 will be easily ignored by processor 110.

Rotating mirror 106 can be a simple, single-sided mirror, preferably with its front surface reflecting to avoid refractive shifts in the glass as the mirror rotates. One can speed up the measurement rate, however, by using a polyhedral mirror such as octagonal mirror 120 shown in FIG. 2. Each of the eight faces scans the beam over the working volume with every revolution, allowing 1000 measurements per second of sensor position if mirror 120 is rotated at 125 Hz.

Figure 2:
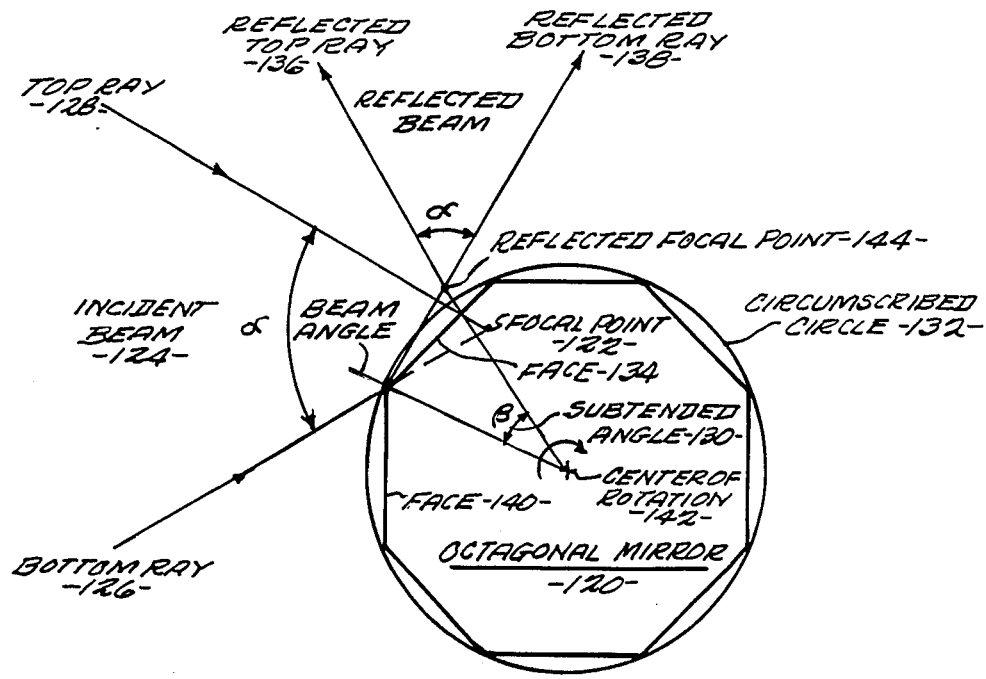
FIG. 2 is a light ray diagram of the rotating mirror used in the invention.

FIG. 2 also illustrates the general advantage of offsetting focal point 122 of the beam from projector 100 from either mirror face 134 or center of rotation 142. While shown here for an octagonal mirror, the advantage described below holds for any number of facets including a single surface mirror. Incident beam 124 is shown in FIG. 2 as scanning a 90° working region (each facet of an octagonal mirror subtends a 45° angle from the center of rotation, so incident light is reflected over 90°). Bottom ray 126 of the incident beam is almost finished with its scan and will begin its next scan as the next mirror face 140 intercepts it. Top ray 128 is, meanwhile, in the middle of its scan and will not finish until mirror 120 has rotated by an angle $\beta$ which is angle 130 subtended by the intersection of incident beam 124 with circle 132 circumscribed around octagonal mirror 120. Since top ray 128 and bottom ray 126 both are reflecting from the same face 134, the angle between reflected top ray 136 and reflected bottom ray 138 is equal to the beam angle of incident beam 124. Since any ray reflected by a rotating mirror changes direction by twice the angle of mirror rotation, the reflected top ray will rotated by an angle $2\beta$ by the time the last of face 134 intercepts it. If the focal point is chosen so that $2\beta = \alpha$, then the final direction of reflected ray 136 will be the same as the final direction of reflected bottom ray 138. Thus the reflected top and bottom rays (and all rays in between) will scan the same angular range and all sensors in this region will see nearly identical intensity signals. (Slight variations will still occur due to motions of the reflected focal point 144 and can be calibrated out.) The offset configuration is a novel aspect of projector 100 and is part of the preferred embodiment.

Figure 3:
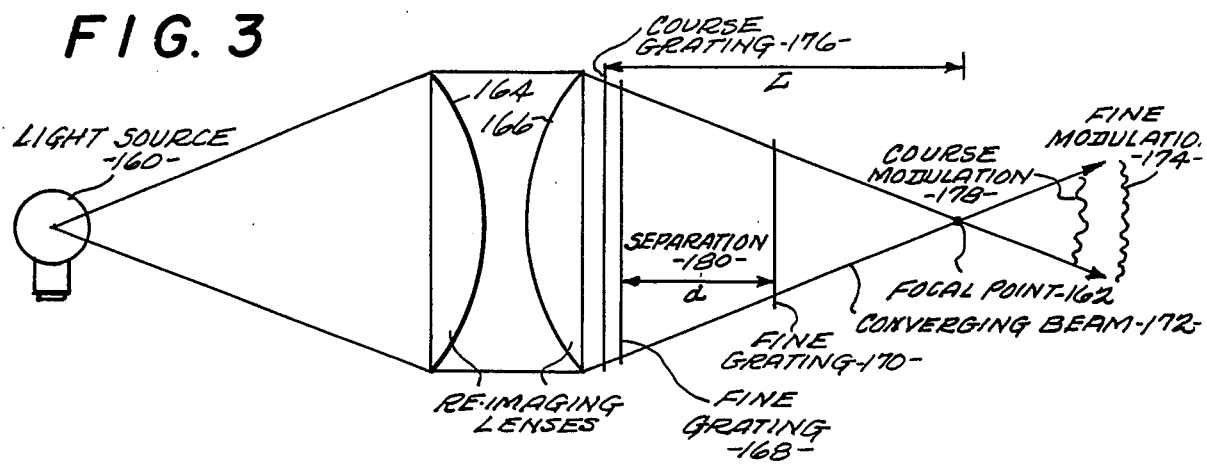
FIG. 3 is one possible embodiment of the light projector used in the invention.

Projector 100 in FIG. 1 must project a precise modulation pattern 102. The accuracy of the projected pattern 102 will determine the accuracy of the measurement prior to calibration, and a more accurate pattern 102 will require less calibration. FIG. 3 shows the preferred embodiment for projector 100.

Light source 160 is imaged onto focal point 162 by lenses 164 and 166. Two identical fine gratings 168 and 170 are placed after lenses 164 and 166 in converging beam 172. The shadow pattern cast by the two Ronchi gratings 168 and 170 produces a fine modulation pattern 174 in the beam emerging from focal point 162. Gratings 168 and 170 consist of alternating transmissive and opaque bars of width $p_o/2$, the two gratings are parallel and separated by distance d. The bar patterns in the two gratings are parallel to each other and to the rotation axis of the spinning mirror. At a distance R after focal point 162, a spatial modulation of period p appears on the outgoing beam where p is given by $$p = p_o R/d$$

Thus the fine grating period $p_o$ is magnified by the ratio of the range to the grating separation. For example, fine gratings where period $p_o = 0.005$ inches and separation $d = 1$ inch will give a modulation period $p = 0.2$ inches when 40 inches beyond focal point 162.

Figure 4:
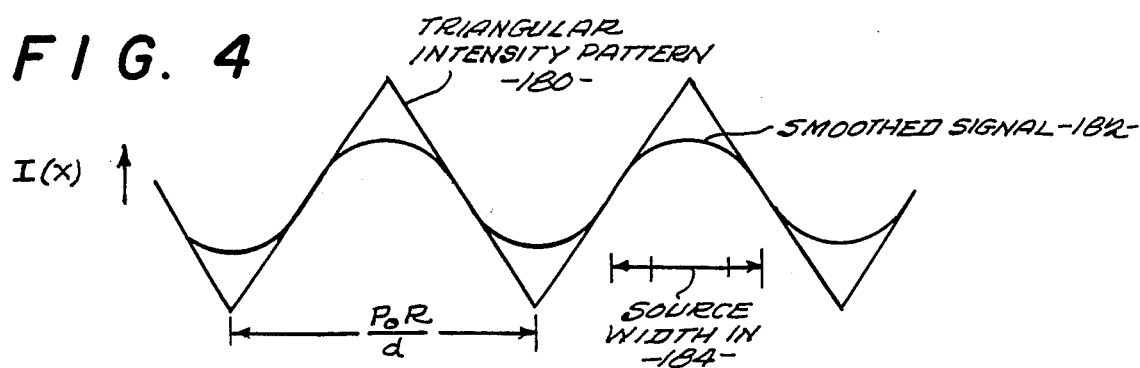
FIGS. 4 and 6 show two different periodic signals created by the light projector.

If light source 60 were a perfect point source and if lenses 164 and 166 were perfect, then the modulation patterns (moire pattern) due to shadow casting (neglecting grating diffraction effects) would be triangular intensity pattern 180 shown in FIG. 4. The effect of grating diffraction can be minimized if the separation between gratings 168 and 170 satisfies the relationship that:

$$\frac{\lambda d}{p_o} = N p_o$$

where $\lambda$ is the mean wavelength of light from source 160 received by sensors in the working volume, and N is a small integer (usually 1 or 2). This relationship means that the light diffracted by grating 168 shifts an integral number of grating cycles sideways relative to undiffracted light by the time it hits grating 170. In this manner, high modulation is preserved.

Since a real source 160 is not a point source, it smears out ideal signal 180 by exactly source width 184 to get smoothed signal 182. In practice, it is usually desirable to maximize the light from source 160 and thus the biggest source possible will be employed which will give the most light without greatly attenuating the fundamental harmonic of intensity pattern 180. Typically, $$W \leq \frac{p_o R}{2d}$$

where W is source width 184 and R is the closest distance expected between focal point 162 and a sensor. For instance, if the working volume is planned to be 0.5-1.5 meters from the illuminator, with $p_o=0.005$ inches and $d=1$ inch as above, then the maximum source width would be $=0.05$ inches.

This source restriction applies only to the dimension perpendicular to the grating bars, and the source may be much longer in the dimension parallel to the grating bars. A longer source gives more light without reducing modulation and allows the light received by any sensor to average over more grating area, thereby reducing the effect of dust or grating area, thereby reducing the effect of dust or imperfections in the grating patterns. Many such sources are available commercially.

The output beam from the projector can have a divergence of up to 60° using standard aspheric condensers. However, along the scan direction, the angular divergence should be reduced to 15°-20° in order to keep the temporal frequency uniform across the beam. The moire pattern of gratings 168 and 170 produces an intensity modulation of constant spatial frequency orthogonal to the beam center (not constant in angle). In polar coordinates instead of Cartesian, the spatial frequency varies proportional to sec $\phi$ where $\phi$ is the angle of a ray with respect to beam center. Thus, the polar frequency of intensity modulation is a minimum in beam center and increases slowly away from beam center. With a 20° beam divergence in the scan direction, the frequency varies by 0.75%. With 15° beam divergence, the frequency varies by 0.37%. If there are 50 cycles across the beam, then the Fourier processing will accept $1/(2\times50)=1\%$ frequency variation; thus the frequency should vary less than 1% across the beam.

With the embodiment illustrated in FIG. 1, a fixed sensor must be placed near the moving object and in the field of moving pattern 102. In some applications, this may be a problem.

Figure 5:
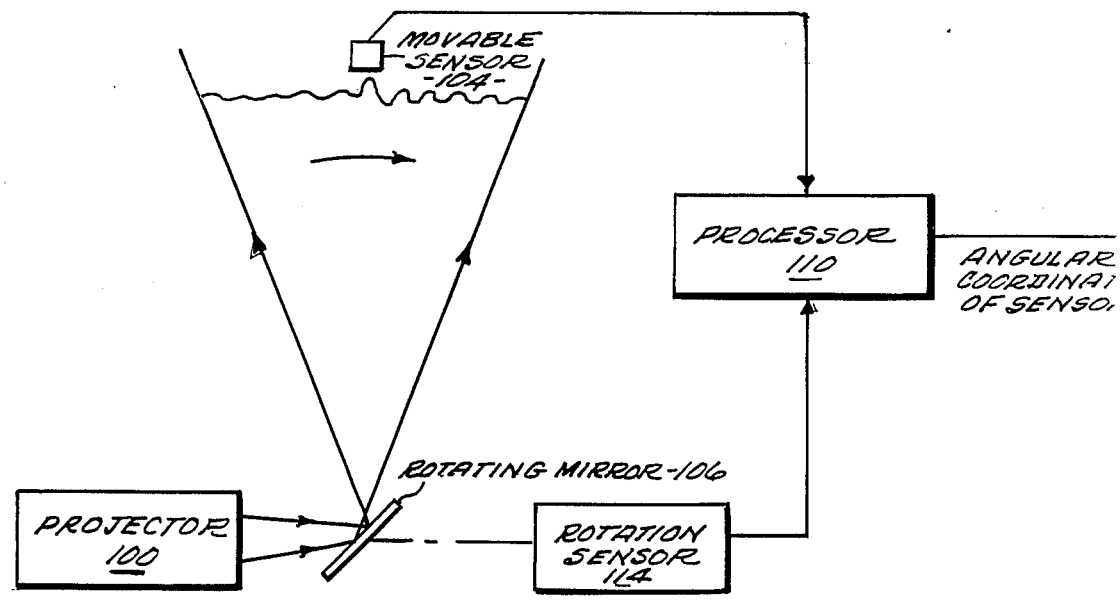
FIG. 5 is a schematic diagram of a second embodiment of the present invention.

An alternative approach is illustrated in FIG. 5 which is identical to the embodiment in FIG. 1 except that fixed sensor 116 is replaced with rotation sensor 114 which monitors the position of rotating mirror 106. Rotation sensor 114 may be an encoder which continually reads out rotation angle data with respect to mirror 106. However, this approach is costly in that an angle accuracy equivalent to 20 micrometers at 1 meter range would require a 19 bit encoder. Nevertheless, this embodiment is advantageous in that the position of the mirror is always precisely determined. When fixed sensor 116 is employed, it must be inferred that mirror 106 rotates at a constant speed. This inference need not be made with respect to the embodiment illustrated in FIG. 5 in that rotation sensor 114 will always produce a signal precisely related to the position of mirror 106. Thus, even if mirror 106 is rotating unevenly, precise data may be obtained with the embodiment illustrated in FIG. 5.

Once processor 110 has found the angular delay of the signal from sensor 104, it will interpret this as coordinate information, or more precisely as a single constraint, on the position of the sensor. If the modulation of beam 102 has the form $I(\theta)=A+B \sin(K\theta)$ as in the preferred embodiments, then the angular delay is known only as modulo $2\pi/K$, and thus there is an ambiguity in the sensor angle. This ambiguity can be removed by several different techniques. First, the sensor can be moved to a known reference position and then tracked in phase through many multiples of $2\pi$. Second, the modulated beam 102 can be modified so that the correlation has no $2\pi$ ambiguities. An example, would be a chirped signal where:

$$I(\theta)=A+B \sin(K\theta+L\theta^2)$$

While the correlation processing of a chirped signal is more complicated, it gives an unambiguous phase shift. Many such waveforms are given in the literature.

A third technique is to have a separate coarse estimation of the sensor position sufficient to resolve the $2\pi$ ambiguity. If the sensor is on a robot manipulator, the robot encoders may provide this additional information. Alternatively, the intensity pattern may be altered to include two or three spatial frequencies, so that all phase measurements together have enough information to resolve any ambiguity. This last is a standard technique used in laser interferometry.

However one resolves the phase ambiguity, once resolved, the phase can thenceforth be tracked. Thus, ambiguity is only a problem of initialization with many options for resolution.

In the preferred embodiment, a single illuminator is employed with a single sensor mounted on the object to determine position along a single coordinate. Several illuminators may be employed to illuminate the same volume from different directions, using different temporal frequencies or timing, so that one sensor can receive light from multiple illuminators and sort out which signal comes from which illuminator. In this manner, multiple coordinate measurements may be made with a single sensor sufficient to completely determine its position.

Of course, this concept may be extended to include multiple sensors on a single rigid object. Thus, the orientation of the object may be determined by comparing the positions of two sensors on the object.

By determining the position of each sensor in space, both the position and orientation of the rigid object can be determined. It is also possible to determine complete position and orientation of a rigid object by obtaining at least six coordinate measurements from sensors attached to the rigid object even though the measurements from any one sensor do not completely determine its position. At least six coordinate measurements are required since a rigid object has six degrees of freedom to determine its position and orientation.

An ideal projector will transmit an intensity pattern $I(\theta-wt)$ where $\theta$ is the angular coordinate of the sensor in a plane perpendicular to the axis of rotation of mirror 120, w is the angular rate of mirror 106 and t is time. Processor 110 will give the angular coordinate of the sensor with such an illuminate. In practice, however, no sensor is perfect and there is a variation of the intensity pattern with position. By virtue of the offset focus condition shown in FIG. 2 all sensor positions at constant range and elevation will see nearly identical signals, and thus any processor output error will change very slowly as $\theta$ changes. This feature greatly simplifies the task of calibrating out the slight measurement errors due to spatially varying intensity modulations in the beam.

Variations in the intensity pattern with range p are also very small since they are caused by changing focus or other similar geometric factors. For constant elevation angle $\gamma$, the same rays of light hit all sensors, no matter what their range p or azimuth $\theta$. Thus, range and azimuth calibration involves only a small correction requiring measurements at only two or three ranges, and two or three azimuths.

Variations in the intensity pattern with elevation angle γ, however, are not so easily handled and depend greatly on the quality and type of optical system used to project the pattern. Fortunately, the variations can be measured and then corrected without excessive effort since the error variations in the other two dimensions have been minimized.

In the calibration process, the sensor position is first estimated by using no calibration correction, and then the actual position is carefully measured by another accurate technique. The corrections to be applied must be measured in advance for each illuminator separately by putting a sensor at a set of known points and measuring the error in the processed signal output. This creates for each illuminator a set of simultaneous equations which may be solved for the correction factors. The more separate measurements that are made, the more equations will result so higher order correction factors may be determined.

Imperfections in gratings 168 and 170 or in their alignment will cause errors in the signals whose effects can be calibrated as long as they are constant. Thus, care should be given to a clean environment for gratings 168 and 170 and a stable mounting. A more difficult problem, however, is variations in source 160. It would be undesirable to have to recalibrate an illuminator every time its bulb is changed. Also, the emission pattern of a bulb can change as it ages and also be nonisotropic.

Figure 6:
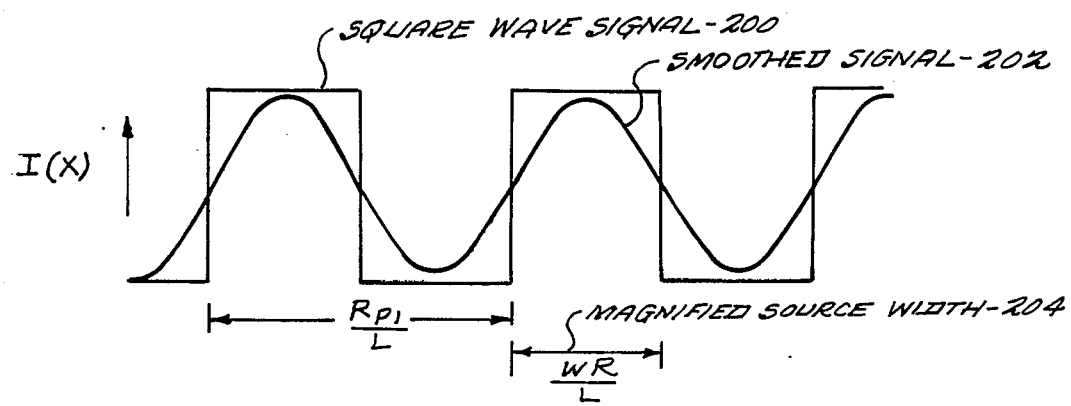

To overcome these problems of source instability and nonisotropy, a third coarse grating 176, as illustrated in FIG. 3, may be added to measure the source position with its alternating transmissive and opaque bars parallel to the bars on gratings 168 and 170. Grating 176 works by shadow casting its bar pattern through focal point 162. If source image 162 were a perfect point, then the shadow image of grating 176 would be a square wave 200 as shown in FIG. 6. If coarse grating 176 were a distance L from focal point 162 in FIG. 3, then the period of the square wave as seen by a sensor at distance R from focal point 162 would be $$P = \frac{R}{L} P_1$$

where $P_1$=period of the coarse grating 176. A real source has a width w and smears the square wave by an amount related to wR/L into smoothed signal 202. To keep high modulation, at the fundamental frequency and to suppress higher frequencies, w can be set in the range $P_1/3$ to $P_1/2$.

If source focal point 162 moved sideways by the amount Δ perpendicular to the grating bars, then fine signal 182 is observed to move by the same amount Δ since it comes from a moire pattern between two gratings while coarse signal 200 moves by a magnified amount ΔR/L since it is a shadow pattern from a single grating. The different shifts mean that the two signals are spatially shifted relative to each other by Δ(R/L−1). This relative shift is a direct measure of any movement of the source focal point and thus can be used to correct for that movement, thereby increasing the accuracy of the sensor position measurement.

Figure 7:
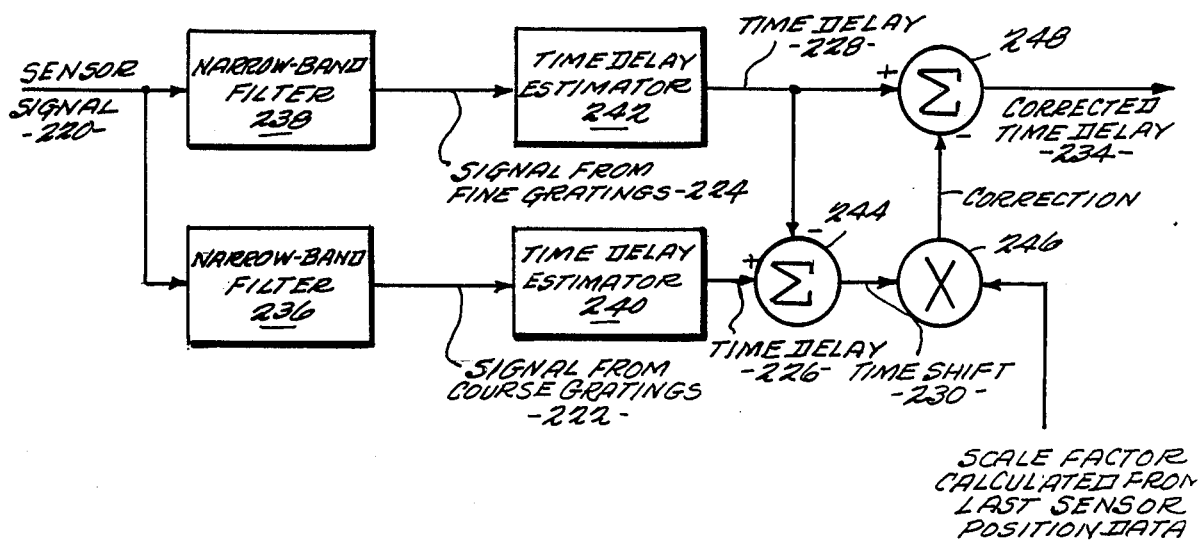
FIG. 7 is a block diagram of circuitry to improve the measurement accuracy.

The processing circuitry used is shown in FIG. 7. When the projector beam is swept past a sensor, signal 220 from sensor 104 is narrow band filtered to separate out low frequency modulation signal 222 due to coarse grating 176 from high frequency modulation signal 224 due to fine grating pair 168 and 170. Then both signals have their respective time delays 226 and 228 measured and subtracted to give time shift 230 between the coarse and fine signals. This time shift 230 is (R/L−1) times the error in the time delay 228 caused by source motion, and thus time shift 230 must be multiplied by a scale factor 1/(R/L−1) to find the correct amount to subtract from time delay 228. This scale factor 232 can be estimated from the previous measurement of the sensor position. That is, the previous measurement provides an estimate of R and L is fixed. After subtraction of the correction 250, the time delay 234 appears corrected for source motion.

By using a third grating, the system is freed from the dependence of the projector on a spatially stable and isotropic source and has increased the measurement precision.

Although only a few exemplary embodiments of the present invention have been described in detail above, those skilled in the art will readily appreciate that many modifications may be made in the preferred embodiments without departing from the present invention. Accordingly, all such modifications are intended to be included within the scope of the present invention as defined by the following claims.

What is claimed is:

1. Apparatus for sensing the position of an object comprising:
   means for projecting a moving periodic pattern on said object, said projecting means including a source of electromagnetic radiation and three gratings through which said electromagnetic radiation passes, two of said gratings being separated and having the same pattern thereon, and the third of said gratings having a different pattern;
   sensing means, attached to said object, for producing a sensor signal related to said periodic pattern;
   means for producing a reference signal related to the position of said moving periodic pattern;
   means for comparing said reference signal and said sensor signal to determine the position of said object; and
   means, responsive to said reference signal and said sensor signal, for compensating the determination of said comparing means for instability and nonisotropy of said source.

2. Apparatus as in claim 1 wherein said comparing means includes means for comparing only those parts of said reference signal and said sensor signal caused by said two gratings.

3. Apparatus as in claim 2 wherein said compensating means includes:
   means for determining the position of said object employing said third grating;
   means for generating a difference signal related to the difference in position as determined by said comparing means and said determining means;
   means for multiplying said difference signal by a factor related to the distance between said third grating and the focal point of said source and the distance to said sensing means to generate a correction signal; and
   means for subtracting said correction signal from the position of said object as determined by said comparing means.

4. Apparatus as in claim 1 wherein said projecting means further includes a moving mirror for causing said pattern to move.

5. Apparatus as in claim 4 wherein said mirror is multi-sided.

6. Apparatus as in claim 5 wherein said mirror has an octagonal cross-section.

7. Apparatus as in claim 4 wherein said source of electromagnetic energy has a focal point behind a surface of said mirror.

8. Apparatus as in claim 1 wherein said two gratings create a pattern having a characteristic that constantly varies in the direction of movement of said pattern so that the position of said pattern may be absolutely identified.

9. Apparatus as in claim 8 wherein said projecting mean projects a pattern having a characteristic $A+B \sin(K\theta+L\theta^2)$, where A, B, K and L are constants and $\theta$ represents angular position in the direction of movement of said pattern.

10. A method for sensing the position of an object comprising the steps of:
projecting a moving periodic pattern on said object, said pattern being created by passing electromagnetic radiation through three gratings, two being separated and having the same pattern, and the third having a different pattern;
comparing said pattern projected on said object with the position of said moving periodic pattern to determine the position of said object; and
correcting the position determined in said comparing step to compensate for instability and nonisotropy in the source of said electromagnetic radiation.

11. A method as in claim 10 wherein:
said comparing step employs the portion of said periodic pattern projected on said object caused by said two gratings; and
said correcting step includes the steps of determining the position of said object employing the pattern projected on said object from said third grating, determining the difference between the position determined in said comparing step with the position determined in said determining step, correcting the difference between positions with a factor related to the distance between said third grating and the focal point of said electromagnetic energy and the distance of said object, and subtracting the corrected value from the position of said object determined in said comparing step.

12. A method as in claim 10 wherein said projecting step includes the step of reflecting a pattern with a moving mirror to create said moving periodic pattern.

13. A method as in claim 12 wherein the focal point of electromagnetic radiation projected onto said mirror is behind a surface of said mirror.

14. A method as in claim 13 wherein:
said mirror rotates; and
the beam angle of electromagnetic radiation incident on said mirror is twice the angle subtended by the intersection of incident electromagnetic radiation with a circle defined by the motion of said mirror, the vertex of said subtended angle being at the center of said circle.

15. A method as in claim 10 wherein said pattern has a characteristic that constantly varies in the direction of movement of said pattern so that the position of said pattern is absolutely identifiable, and said method includes the step of identifying the position of said pattern.

16. A method as in claim 15 wherein said pattern varies according to $A+B \sin(K\theta+L\theta^2)$, where A, B, K and L are constants and $\theta$ represents angular position in the direction of movement of said pattern.

17. Apparatus for sensing the position of an object comprising:
means for projecting a moving periodic pattern on said object, said projecting means including:
(1) a fixed source of electromagnetic radiation,
(2) two separate gratings through which the electromagnetic radiation passes, said gratings having the same pattern, for creating said periodic pattern and
(3) a moving mirror for deflecting said periodic pattern;
sensing means, attached to said object, for producing a sensor signal related to said periodic pattern;
means for producing a reference signal related to the position of said moving periodic pattern; and
means for comparing said reference signal and said sensor signal to determined the position of said object.

18. Apparatus for sensing the position of an object comprising:
means for projecting a moving periodic pattern on said object, said projecting means including means for projecting a pattern that has a characteristic which constantly varies in the direction of the movement of said pattern so that each portion of said pattern is absolutely identifiable;
sensing means, attached to said object, for producing a sensor signal related to said periodic pattern;
means for producing a reference signal related to the position of said moving periodic pattern; and
means for comparing said reference signal and said sensor signal to determine the position of said object.

19. Apparatus as in claim 18 wherein said pattern varies in accordance with $A\theta B \sin(K\theta+L\theta^2)$, where A, B, K and L are constants and $\theta$ is angular position in the direction of movement of said pattern.

20. A method for sensing the position of an object comprising:
projecting a moving periodic pattern on said object inlcuding the step of projecting electromagnetic radiation through two separated gratings having the same pattern to form said periodic pattern of radiation;
sensing said peridoic pattern with a sensor on said object; and
comparing said periodic pattern sensed by said sensor on said object with the position of said moving periodic pattern to determine the position of said object.

21. A method for sensing the position of an object comprising:
projecting a moving periodic pattern on said object, said pattern having a characteristic which varies in the direction of movement of said pattern so that the position of said pattern can be absolutely identified;
sensing said pattern with a sensor on said object; and
comparing said periodic pattern sensed by said sensor on said object with the position of said moving periodic pattern to determine the position of said object.

22. A method as in claim 21 wherein said pattern varies according to $A+B \sin(K\theta+L\theta^2)$, where A, B, K and L are constants and $\theta$ represents angular position in the direction of movement of said pattern.

* * * * *